Jan. 24, 1933.　　　C. M. ELLENBERGER ET AL　　　1,894,945
SPARE WHEEL CARRIER AND LOCK
Filed July 8, 1931　　2 Sheets-Sheet 1
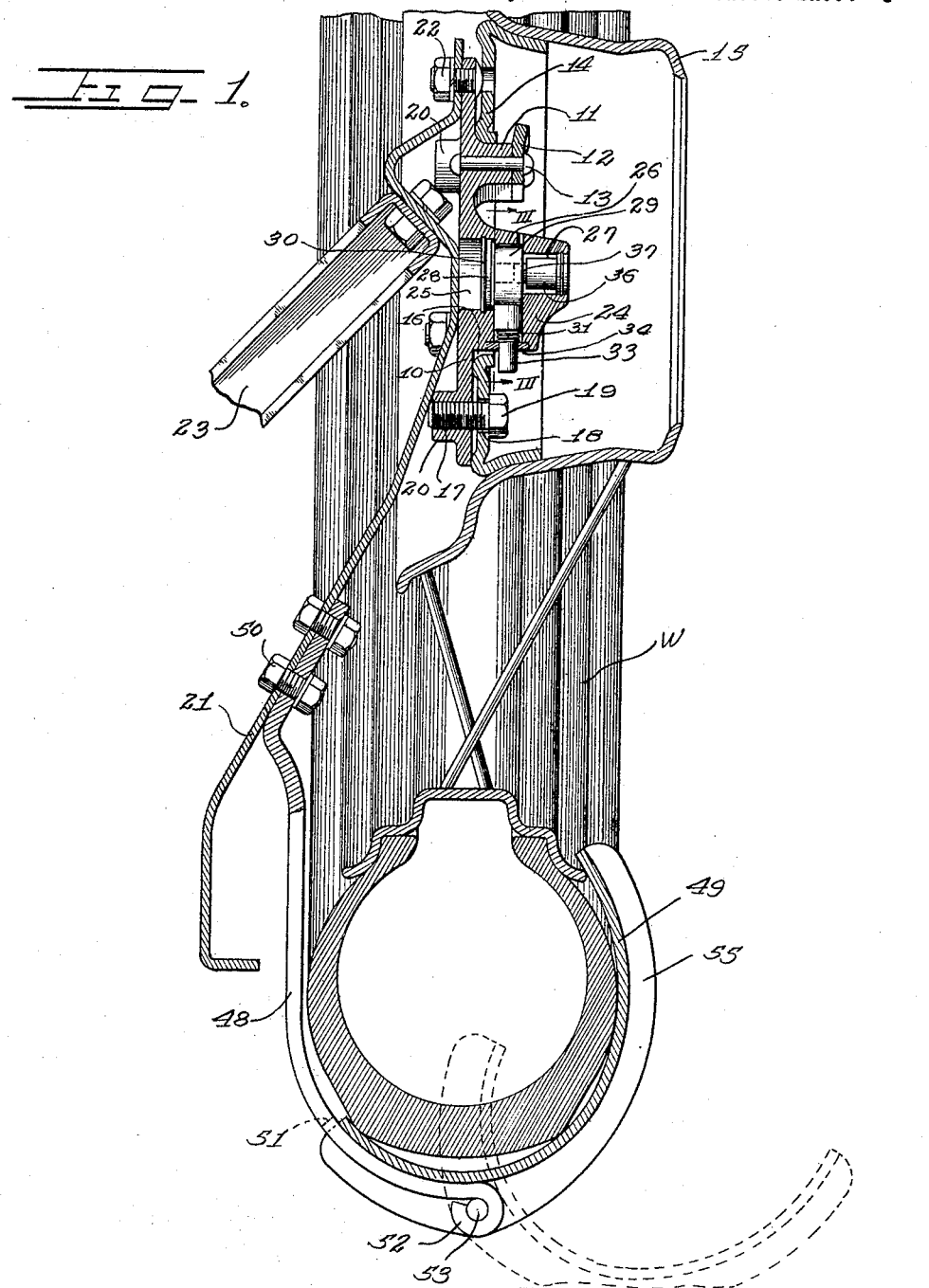
Inventors
Clarence M. Ellenberger,
Frederick A. Smith.
By Charles W. Hills
Attys.

Jan. 24, 1933.  C. M. ELLENBERGER ET AL  1,894,945
SPARE WHEEL CARRIER AND LOCK
Filed July 8, 1931   2 Sheets-Sheet 2
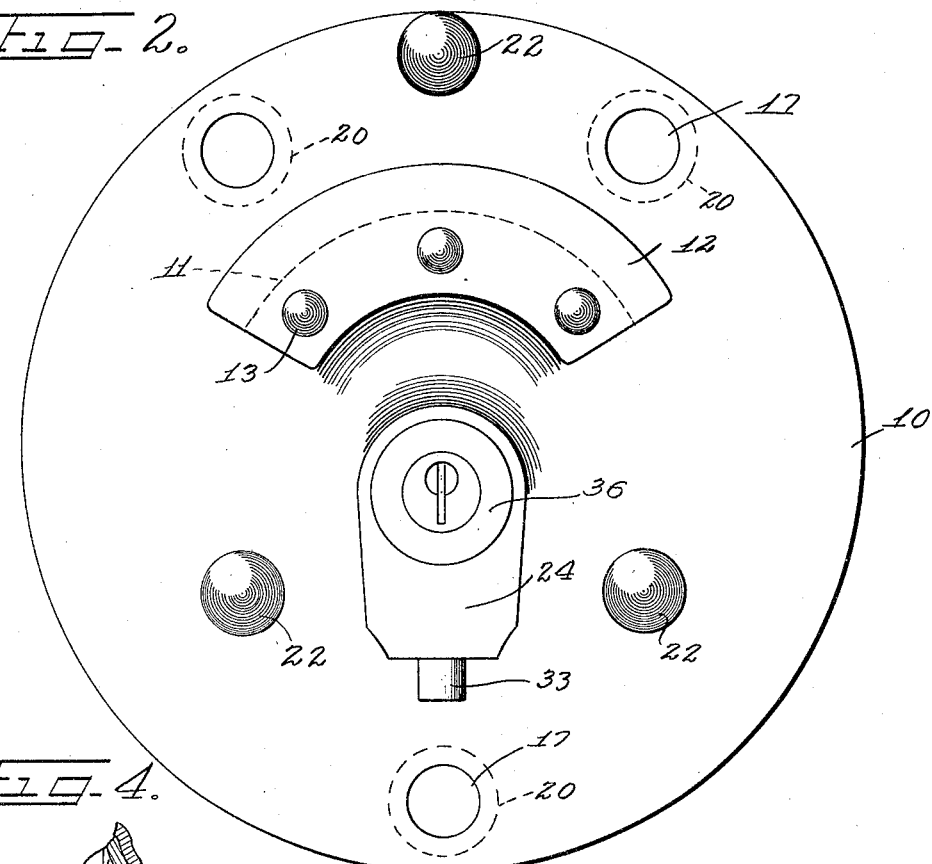
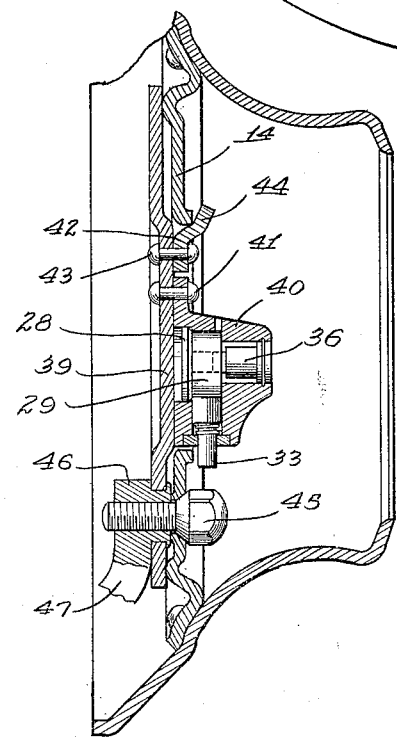
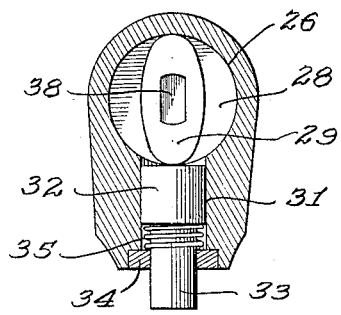
Inventors
Clarence M Ellenberger,
Frederick A. Smith.

Patented Jan. 24, 1933

1,894,945

UNITED STATES PATENT OFFICE

CLARENCE M. ELLENBERGER, OF DETROIT, MICHIGAN, AND FREDERICK A. SMITH, OF NORTH CHICAGO, ILLINOIS, ASSIGNORS TO OAKES PRODUCTS CORPORATION, OF NORTH CHICAGO, ILLINOIS, A CORPORATION OF MICHIGAN

SPARE WHEEL CARRIER AND LOCK

Application filed July 8, 1931. Serial No. 549,342.

This invention relates to carrier and lock mechanism particularly adaptable for carrying and locking spare wire wheels.

An important object of the invention is to provide carrier structure having a hook or ledge over which the hub of a spare wheel is placed at its upper side, and adapted to receive a bolt for engaging the hub flange at its lower side to hold the hub in alignment on the carrier, together with a key-controlled lock detent to be projected in front of the hub flange to prevent removal of the spare wheel without unlocking the lock.

A further important object of the invention is to provide a two-piece band or loop automatically closed to encompass the spare wheel tire when the wheel is applied to the carrier, which band or loop is held in closed position by the tire so long as the tire is held locked to the carrier.

The invention also includes other features of construction and arrangement, all the features being incorporated in the structure disclosed on the drawings, in which drawings:

Figure 1 is a vertical diametral section through a carrier structure and a spare wheel supported thereon;

Figure 2 is an enlarged front elevation of the hub receiving carrier part;

Figure 3 is an enlarged section on plane III—III of Figure 1; and

Figure 4 is a section similar to Figure 1 showing a modified arrangement.

Referring to the structures of Figures 1 to 3, the carrier comprises a circular support 10 having above its center an arcuate forward projection 11 forming an upper seating surface concentric with the support 10 and having secured to its front end a retainer plate 12 by means of rivets 13, the retainer plate projecting a distance above the ledge surface with its upper surface preferably concentric with the ledge seating surface. The ledge and plate form an arcuate retaining hook surface for receiving the flange or inner wall 14 of the hub 15 of a spare wheel W. The radius of the arcuate seating surface of the ledge 11 is preferably equal to the radius of the central opening 16 through the wall 14 so that when the wheel hub is applied on the ledge it will securely seat thereon behind the retainer plate 12. The supporting member 10 may have one or more threaded openings 17 for registering with the bolt holes 18 in the hub wall 14 which holes receive the bolts which secure the spare wheel to the vehicle hub. We have shown the support 10 provided with three threaded holes 17 for the reception of screws 19 for rigidly securing the hub wall 14 against the support 10. To afford sufficient threading engagement of the bolts, lugs 20 may be provided on the supporting member 10.

The support 10 may be mounted at any desired location on a vehicle. We have shown a supporting plate 21 therefor secured thereto by bolts 22, a brace member 23 connecting with the plate 21.

Below the ledge 11 a boss 24 extends forwardly from the supporting member 10, and this boss and also the ledge 11 may form an integral part of the member 10. As shown in Figure 1, the boss is bored to provide a rear cylindrical chamber 25, an intermediate cylindrical chamber 26 of slightly less diameter, and an outer cylindrical chamber 27 of further reduced diameter. Rotatable within the chamber 25 is a cylindrical hub 28 from which an elliptical or oval shaped cam lug 29 extends into the intermediate chamber 26, the hub being held in the chamber by any suitable means as, for example, by the annular key 30. Extending radially downwardly from the cam lug chamber to the exterior of the boss is the cylindrical passage or guideway 31 for a latch plunger or pin 32 whose reduced end 33 extends through and is guided by a plate or plug 34 inserted in the extended outer end of the passageway, as clearly shown in Figure 3. A spring 35 encircles the reduced end of the pin and engages between the plug 34 and the plunger body and tends to shift the plunger inwardly to draw its reduced end into the passageway 31. When the cam lug is turned with its minor axis in alignment with the latch pin the spring may shift the pin inwardly, and when the cam lug is turned to bring its major axis into alignment with the latch pin the pin will be shifted outwardly to project its reduced end below the boss and in front of the wall 14 of the hub to prevent removal of the wheel.

For rotating the cam structure, a lock cylinder 36 is rotatably mounted in the outer chamber 27 of the boss but is locked against axial movement, and at its inner end the lock cylinder has a polygonal projection or tongue 37 extending into a correspondingly shaped hole 38 in the cam lug so that when the lock cylinder is turned by a suitable key the cam structure will be turned to position the cam lug relative to the latch pin. On Figure 1 the lock has been turned to cause the cam lug to project the latch pin and the wheel is locked against removal from the carrier. To remove the wheel, the bolts 19 are first withdrawn and then the key is inserted and the lock is turned to cause the cam lug to release the latch pin for inward movement by its spring, and then the wheel, after a slight canting thereof, may be raised and lifted to clear the retainer plate 12 and will then be freed from the carrier. To mount the wheel on the carrier, it is first hooked over the ledge and then swung against the support 10 and the lock is turned to cause the cam lug to project the latch pin. The bolts 19 are then applied and the wheel cannot be removed without first releasing the latch pin by the turning of the lock.

Figure 4 shows a somewhat modified arrangement. In the arrangement of Figure 1 the member 10 with its ledge 11 and boss 24 is a casting. In the arrangement of Figure 4, the carrier support is in the form of a sheet metal circular disc 39 and the boss 40 may be a casting secured to the disc as by means of rivets 41. An arcuate sheet metal retainer bracket 42 is secured as by rivets 43 to the disc 39 with its outer end 44 offset to form a hook for receiving the hub wall 14. To receive the screws 45 for clamping the hub to the disc 39, threaded lugs 46 may be riveted to the disc and such lugs may also serve to support the braces or brackets 47 which secure the disc 39 to a vehicle body.

The cam and lock arrangement within the boss 40 is the same as that in the structure of Figure 1.

To prevent theft of the tire from a spare wheel mounted on the carrier, we provide a lock band or loop comprising the stationary member or piece 48 and the locking member or piece 49. The member 48 may be a flat metal bar secured at its upper end to the carrier supporting plate 21 by means of rivets or bolts 50. The member extends downwardly with its lower end curved and having a longitudinal slot 51 with the ends deflected back to form bearings or clamps 52 for a hinge pin 53.

The locking member 49 is of substantially semicircular shape and is provided with a strengthening rib 55 extending therefrom. This rib receives the hinge pin 53 a distance inwardly from the lower end thereof. When the lock member is swung up, the outer end of the rib extends through the slot 54 and the adjacent end of the member abuts against the top of the bar 48, and when the lock member is swung down, its inner end will project upwardly and its outer end laterally. In Figure 1 the full lines show the lock member in closed position and the dotted lines show it in open position. When a spare wheel is to be applied to the carrier the tire at the lower part thereof will encounter the upstanding end of the lock member 49 and as the wheel is brought into position on the carrier the lock member will be swung to bring its inner end against the bar 48 and its outer end around the outside of the tire to lock the tire against removal. The application of the wheel, therefore, swings and holds the lock member in locking position and the lock member cannot be removed until the wheel is unlocked and withdrawn from the carrier. Preferably, the lock member extends a distance above the lower edge of the wheel rim so as to prevent the insertion of implements for prying away the lock member or the tire. Even though the tire were pried off of the wheel rim it could not be removed on account of the locking loop.

We have shown a practical and efficient embodiment of the various features of our invention, but we do not desire to be limited to the exact construction and arrangement shown as modifications and changes may be made without departing from the scope of the invention as defined by the appended claims.

We claim as follows:

1. In spare wheel carrier structure, the combination of a support forming a seat for the hub of a spare wheel to be carried, an arcuate ledge of hook shaped cross section extending forwardly from said support near the top thereof for receiving the upper part of the wheel hub to suspend the wheel from the support, and means for locking the hub against removal from said ledge.

2. In spare wheel carrier structure, the combination of a support forming a seat for the hub of a wheel to be carried, a ledge of hook shaped cross section extending forwardly from said support for receiving the upper part of the hub to suspend the wheel on said support, and a downwardly shiftable lock detent on said support for locking the hub against removal from said ledge.

3. In spare wheel carrier structure, the combination of a support forming a seat for the hub of a wheel to be carried, a ledge of hook shaped cross section extending forwardly from the upper part of said support for receiving the upper part of a wheel hub to suspend the wheel from the support, a boss projecting forwardly from said support above the lower end of the wheel hub, and a lock detent adapted to be projected from said boss in front of the hub to prevent removal of the hub from said ledge.

4. In spare wheel carrier structure, the combination of a support forming a vertical seat for the hub of a spare wheel to be carried, a hook member at the upper part of said support for receiving a hub at its upper part to suspend the wheel on the support, and lock mechanism on said support below said hook, said lock mechanism comprising a lock detent and means for projecting it into the path of the lower part of the hub to prevent removal of the hub from the hook.

5. In spare wheel carrier structure, the combination of a support forming a vertical seat for the hub of a wheel to be carried, an arcuate ledge of hook shaped cross section on the upper part of said support for receiving a hub at its upper part to suspend the wheel on the support, a boss extending from the support below said ledge, a latch pin shiftable in said boss, a cam member rotatable in said boss for controlling the shift of said latch pin, and a key controlled lock cylinder in said boss for rotating said cam member, said latch pin when projected by said cam member being in front of a hub part to prevent removal of the hub from the ledge.

6. In spare wheel carrier lock mechanism, the combination of a support, a ledge on said support and a boss below the ledge, said ledge and boss extending forwardly from the support to extend through an aperture in the wall of a hub of a wheel to be carried to hold the wheel against vertical displacement and said support forming a vertical seat for the hub, said ledge being hook shaped to suspend the wheel on the support and prevent forward displacement thereof, a latch pin shiftable in said boss, and lock control means in said boss controlling the shifting of said latch pin, said pin when shifted outwardly cooperating with said ledge to prevent removal of the wheel from the support.

7. In carrier structure for spare wheels, the combination of a support for receiving the hub of a spare wheel, means for securing the hub to the support, and a two-piece tire receiving loop comprising an inner member and an outer member, said inner member being secured to said support and extending around the rear side of the tire, the outer member being hinged intermediate its ends to the end of the inner member with its inner end projected upwardly in the path of the tire of a wheel when applied to the carrier, said projecting end being swung inwardly by the tire to carry the outer end thereof into position around the outer side of the tire to lock the tire against removal from the wheel when the wheel is secured at its hub to the support.

8. In spare wheel carrier structure, the combination of a support for receiving the hub of a wheel to be carried, means for locking the wheel hub to the support, a tire retaining loop comprising outer and inner members, the inner member of said loop being secured to said support to extend around the inner side of the wheel tire, said outer member being pivoted intermediate its ends to the end of the inner member, the inner end of said outer member projecting upwardly to be in the path of the tire of a wheel to be applied to the support and the outer end extending laterally whereby when a wheel is applied to the support its tire will engage with the inner end of the outer member and swing the outer end upwardly into position around the outer side of the tire whereby said tire is locked against removal from the wheel when the wheel hub is locked to the support.

9. In spare wheel carrier structure, the combination of a support for receiving the hub of a spare wheel, means for securing the hub to the support, the lower end of said support forming an abutment for the tire on a wheel to be locked, a substantially semicircular locking bar pivoted intermediate its ends to the lower end of said support, said bar when released having its front end swung downwardly by gravity and its inner end projected upwardly into the path of the tire of a wheel to be locked whereby when the wheel hub is applied to the support the engagement of the tire with the inner end of said bar will cause the outer end of the bar to swing upwardly against the front side of the tire to form a lock for preventing removal of the tire from the wheel when the wheel hub is secured to the support.

10. In carrier structure for spare wheels, the combination of a support comprising a head for receiving the hub of a wheel, means for locking the hub to said head, the lower end of said support forming an abutment for the wheel tire, a locking bar pivoted to and extending forwardly from the lower end of said support, and an extension on said locking bar normally extending into the path of the wheel tire to be engaged thereby to cause swing of said locking bar against the front side of the tire when the wheel hub is applied to said support head whereby said bar will prevent theft of the tire when the wheel hub is secured to said head.

In testimony whereof, we have hereunto subscribed our names at North Chicago, Lake County, Illinois.

CLARENCE M. ELLENBERGER.
FREDERICK A. SMITH.